United States Patent
Kim et al.

(10) Patent No.: US 10,769,916 B2
(45) Date of Patent: Sep. 8, 2020

(54) REFRIGERATOR AND HOME AUTOMATION SYSTEM HAVING THE SAME

(71) Applicant: LG ELECTRONICS INC., Seoul (KR)

(72) Inventors: Sangoh Kim, Seoul (KR); Hyungyul Kim, Seoul (KR); Jongho Yun, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 15/689,623

(22) Filed: Aug. 29, 2017

(65) Prior Publication Data

US 2018/0089973 A1 Mar. 29, 2018

(30) Foreign Application Priority Data

Sep. 28, 2016 (KR) .................. 10-2016-0125016

(51) Int. Cl.
*F25D 29/00* (2006.01)
*G08B 13/196* (2006.01)
(Continued)

(52) U.S. Cl.
CPC ..... *G08B 13/19695* (2013.01); *F25D 23/028* (2013.01); *F25D 29/00* (2013.01);
(Continued)

(58) Field of Classification Search
CPC ...... F25D 29/008; F25D 29/00; F25D 23/028; F25D 29/005; H04N 7/188; H04N 7/183; H04W 68/005; H04L 67/125; H04L 12/2818; G08B 13/19695; G08B 13/1966; G08B 13/19658

See application file for complete search history.

(56) References Cited

U.S. PATENT DOCUMENTS 9,836,069 B1 * 12/2017 Nelmes .................. G05B 15/02
2006/0237427 A1 10/2006 Logan
(Continued)

FOREIGN PATENT DOCUMENTS

CN 1536308 10/2004
CN 201955861 8/2011
(Continued)

OTHER PUBLICATIONS

Korean Office Action issued in Application 10-2016-0125016 dated Sep. 27, 2018 (full Korean text).
(Continued)

*Primary Examiner* — Neil R Mikeska
(74) *Attorney, Agent, or Firm* — KED & Associates LLP

(57) ABSTRACT

A refrigerator may include: a communication device, an object detection sensor for sensing an object positioned within a predetermined region around the refrigerator door; and a controller for controlling the refrigerator to operate in a specific mode based on a connected state between the communication network and preset mobile terminals. If an object sensing signal is received from the object detection sensor in the specific mode, the controller may send a notification to at least one of the preset mobile terminals through the communication network.

20 Claims, 11 Drawing Sheets

(51) Int. Cl.
  *F25D 23/02* (2006.01)
  *H04L 12/28* (2006.01)
  *H04L 29/08* (2006.01)
  *H04N 7/18* (2006.01)
  *H04W 68/00* (2009.01)
  *G06K 9/00* (2006.01)

(52) U.S. Cl.
  CPC ......... *F25D 29/005* (2013.01); *F25D 29/008* (2013.01); *G08B 13/1966* (2013.01); *G08B 13/19658* (2013.01); *H04L 12/2818* (2013.01); *H04L 67/125* (2013.01); *H04N 7/183* (2013.01); *H04N 7/188* (2013.01); *H04W 68/005* (2013.01); *F25D 2500/06* (2013.01); *F25D 2700/02* (2013.01); *F25D 2700/04* (2013.01); *G06K 9/00255* (2013.01); *G06K 9/00288* (2013.01); *H04L 2012/285* (2013.01)

(56) References Cited

U.S. PATENT DOCUMENTS

| | | | | |
|---|---|---|---|---|
| 2011/0260553 | A1* | 10/2011 | Poyner | A47L 15/0049 307/115 |
| 2014/0370469 | A1* | 12/2014 | Krystek | A47L 15/0063 434/236 |
| 2015/0068069 | A1* | 3/2015 | Tran | H04B 1/385 36/136 |
| 2015/0161871 | A1* | 6/2015 | Kim | A61B 5/1171 340/539.12 |
| 2015/0232320 | A1 | 8/2015 | Wait et al. | |
| 2016/0261932 | A1* | 9/2016 | Fadell | H04Q 9/00 |
| 2017/0108236 | A1* | 4/2017 | Guan | G05B 15/02 |
| 2017/0115649 | A1* | 4/2017 | Richardson | G05B 19/048 |

FOREIGN PATENT DOCUMENTS

| | | |
|---|---|---|
| CN | 102999996 | 3/2013 |
| CN | 203011072 | 6/2013 |
| CN | 203657313 | 6/2014 |
| CN | 203893572 | 10/2014 |
| CN | 105466147 | 4/2016 |
| CN | 105741510 | 7/2016 |
| DE | 10-2016-000595 | 8/2016 |
| EP | 2 827 084 | 1/2015 |
| JP | 2005-092622 | 4/2005 |
| JP | 2005-241215 | 9/2005 |
| JP | 2010-181066 | 8/2010 |
| JP | 2016-114346 | 6/2016 |
| KR | 10-2001-0074381 | 8/2001 |
| KR | 10-2005-0005151 | 1/2005 |
| KR | 10-2006-0028293 | 3/2006 |
| KR | 2012-0030654 | 3/2012 |
| WO | WO 01/17406 | 3/2001 |
| WO | WO 2016/089440 | 6/2016 |

OTHER PUBLICATIONS

European Search Report dated Jan. 24, 2018 issued in Application No. 17188812.6.
Korean Office Action dated Mar. 20, 2018 issued in Application No. 10-2016-0125016.
Chinese Office Action dated Aug. 5, 2019 issued in Application 201710881912.8 (full Chinese text and English translation).
Chinese Office Action dated Jan. 21, 2020 issued in Application No. 201710881921.8 (with English Translation).

* cited by examiner

REFRIGERATOR AND HOME AUTOMATION SYSTEM HAVING THE SAME

CROSS-REFERENCE TO RELATED APPLICATION

This application claims the benefit of an earlier filing date of and the right of priority to Korean Application No. 10-2016-0125016, filed Sep. 28, 2016, the subject matter of which is incorporated herein by reference.

BACKGROUND

1. Field

This disclosure relates to a refrigerator capable of performing a crime prevention function, a (silver) care function or a children care function to monitor an activity state of an old person or a child who is at home alone, and a home automation system having the refrigerator.

2. Background

A refrigerator is a device to keep food items stored therein at a low temperature by using cool air generated by a refrigerating cycle where processes of compression-condensation-expansion-evaporation are performed continuously.

Based on development of the Internet of Things (IoT) technology for sharing information by connecting everyday things to each other through a wired/wireless network, a refrigerator may extend its functions as a smart device. That is, the smart device may perform not only its basic function (to freshly store food items), but also a food item managing function to manage an expiration date of food or to order food, an entertainment function to provide news or music, and/or etc.

As a number of double-income families and one-member families is increasing, a number of empty houses during the daytime is increasing. Accordingly, a number of households equipped with an additional crime prevention system is gradually increasing. However, high costs may be required to install and maintain such a crime prevention system.

As a time for which a guardian is not at home due to an economic activity or an outgoing is increased, an old person or a child may remain alone at home. The guardian may wish to check the old person or child's activity state. However, high costs may be required to install such a system.

Unlike other home appliances, a refrigerator has advantages in that power supply is possible for 24 hours, and it may be provided with a communication function due to its recent extended functions. For example, the refrigerator may be provided with an object detection sensor, a camera, etc. By using such advantages, a crime prevention function may be performed to sense an intruder who has intruded an empty house, a care function to monitor an old person's activity state, and/or a children care function to monitor a child's activity state.

Japanese Laid-Open Patent Application No. 2010-181066 (Laid-open on Aug. 19, 2010), the subject matter of which is incorporated herein by reference, discloses a technique to perform a crime prevention function at night or at a specific time by using an object detection sensor of a refrigerator. Korean Laid-Open Patent Application No. 10-2006-0028293 (Laid-open on Mar. 29, 2006), the subject matter of which is incorporated herein by reference, discloses an intrusion sensing system that uses a robot cleaner.

However, such techniques may disclose only a crime prevention technique using a sensor, a camera, a communication network, etc. These techniques do not disclose to operate in a specific mode (a general mode, a crime prevention mode, a (silver) care or children care mode, etc.) by actively determining whether a user is at home or not (without a user's setting), a technique to prevent a user who is at home from being misunderstood as an intruder, and/or the like.

The above references are incorporated by reference herein where appropriate for appropriate teachings of additional or alternative details, features and/or technical background.

BRIEF DESCRIPTION OF THE DRAWINGS

Arrangements and embodiments may be described in detail with reference to the following drawings in which like reference numerals refer to like elements and wherein.

DETAILED DESCRIPTION

A refrigerator and a home automation system having the same may be explained in more detail with reference to the attached drawings.

In this specification, same or equivalent components may be provided with the same reference numbers, and description thereof may not be repeated.

A structure applied to one embodiment may be equally applied to another embodiment, unless there is any contradiction structurally or functionally.

A singular expression includes a plural concept unless there is a contextually distinctive difference therebetween.

It should also be understood that embodiments are not limited by any of the details of the attached drawings, but rather should be construed broadly within its spirit and scope and it is intended that embodiments cover modifications and variations provided they come within the scope of the appended claims and their equivalents.

Figure 1:
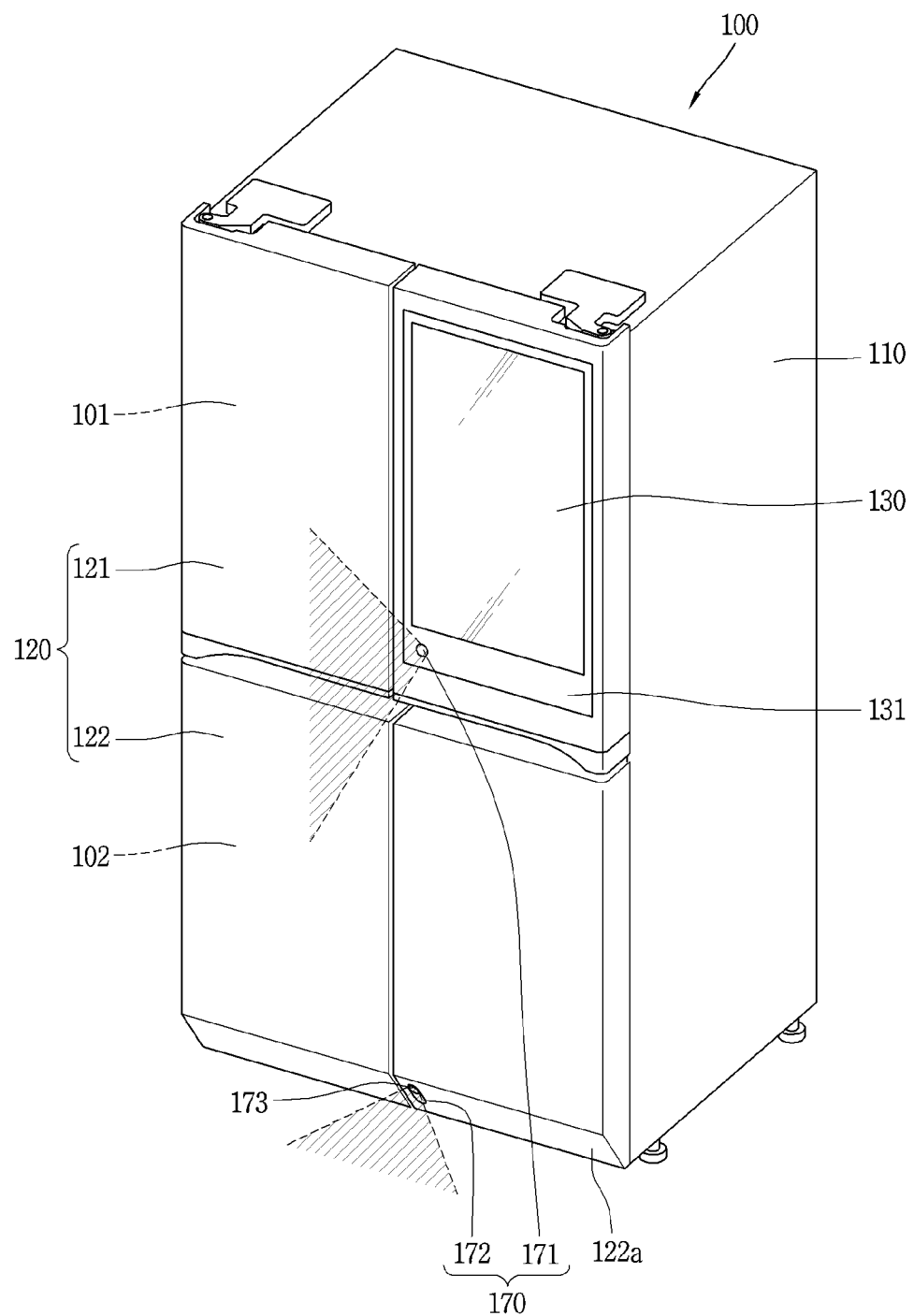
FIG. 1 is a front view of a refrigerator according to an example embodiment.
Figure 2:
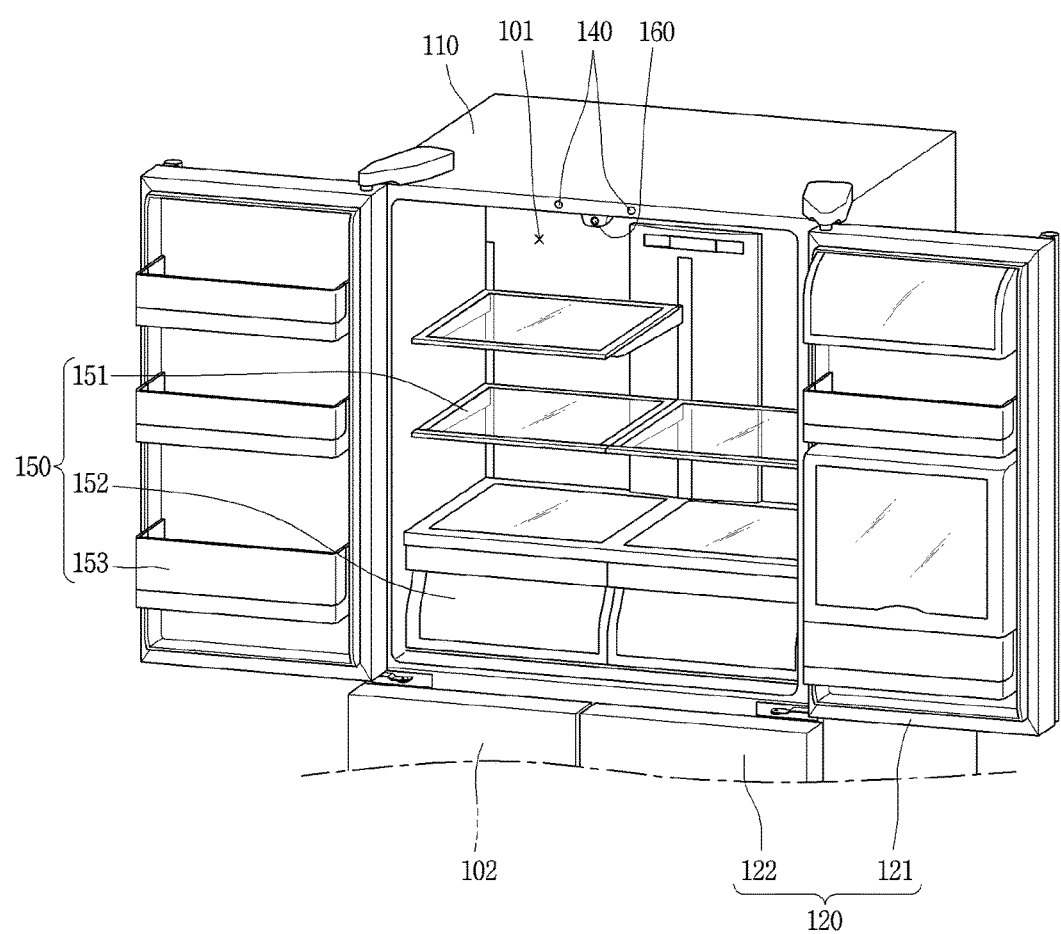
FIG. 2 is a view showing an open state of a refrigerator door of the refrigerator shown in FIG. 1.

FIG. 1 is a front view of a refrigerator 100 according to an example embodiment. FIG. 2 is a view showing an open state of a refrigerator door 120 of the refrigerator 100 shown in FIG. 1. Other embodiments and configurations may also be provided.

FIGS. 1 and 2 show a refrigerator body 110 that is provided with a storage space for storing food items in the refrigerator 100. The storage space may be divided by a partition wall, or may be divided into a refrigerating chamber 101 and a freezing chamber 102 according to a setting temperature.

In this embodiment, the bottom freezer type of refrigerator 100 is shown where the refrigerating chamber 101 is disposed above the freezing chamber 102. However, embodiments are not limited to this. That is, embodiments may be also applicable to a side by side type of refrigerator where the refrigerating chamber 101 and the freezing chamber 102 are disposed right and left, a top mount type of refrigerator where the freezing chamber 102 is disposed above the refrigerating chamber 101, etc.

A refrigerator door 120 is connected to the refrigerator body 110 to open and close the inside of the refrigerator 100. A refrigerating chamber door 121 and a freezing chamber door 122 are configured to open and close a front portion of the refrigerating chamber 101 and a front portion of the freezing chamber 102, respectively. The refrigerator door 120 may be implemented as a rotatable door rotatably connected to the refrigerator body 110, a drawer type of door slide-moveably connected to the refrigerator body 110, etc.

A display unit 130 (or display device) for outputting visual information may be provided at the refrigerator door 120. The display unit 130 may be implemented as a touch screen to which a touch input is inputtable. The display unit 130 may be configured to display not only information on the refrigerator (e.g., an expiration date of stored food), but also other information (e.g., news, shopping, etc.).

A door switch 140 for sensing whether the refrigerator door 120 is open or not is provided at the refrigerator 100. For example, the door switch 140 is installed at the refrigerator body 110, and may be configured to sense an open state of the refrigerator door 120 by being pressurized by the refrigerator door 120 when the refrigerator door 120 is closed, and by being restored (protruded) when the refrigerator door 120 is open.

The door switch 140 may not be limited to such a pressurization-restoration mechanism by an external force. As another example, the door switch 140 may be configured to sense an open state of the refrigerator door 120 through a proximity sensor which senses whether the refrigerator door 120 has approached the refrigerator body 110.

At least one accommodation unit 150 (e.g., a shelf 151, a tray 152, a basket 153, etc.) is provided at the refrigerator 100 for efficient utilization of an inner storage space. For example, the shelf 151 and the tray 152 may be installed in the refrigerator body 110, and the basket 153 may be installed inside the refrigerator door 120 connected to the refrigerator body 110.

The refrigerator 100 may be provided with a camera 160. The camera 160 may be installed on at least one of the refrigerator body 110 and the refrigerator door 120, and may be configured to capture food items stored in the refrigerator 100 when the refrigerator 100 operates in a general mode. A captured image may be displayed on the display unit 130 provided at the refrigerator door 120, or may be transmitted to mobile terminals 20 (e.g., user's mobile terminals 21, 22, 23).

The camera 160 may be installed on an upper end inside the refrigerator 100. However, embodiments are not limited to this. The camera 160 may be installed at various positions, e.g., below the shelf 151, on a lower end of the basket 153 provided inside the refrigerator door 120.

When the refrigerator door 120 is open, the camera 160 is exposed to the outside of the refrigerator. When the refrigerator 100 operates in a specific mode (different from a general mode) and the refrigerator door 120 is open, the camera 160 may be configured to capture a peripheral image of the refrigerator door 120 (a photo, a video, etc.). This may be explained below.

At least one object detection sensor 170 may be provided at the refrigerator door 120. The object detection sensor 170 may be called as a human detection sensor, for example. The object detection sensor 170 may sense or detect whether a person (man) has approached the refrigerator door 120 (or not), in a manner to sense an object positioned within a predetermined region near (or around) the refrigerator door 120 (or within a predetermined distance from the sensor). The object detection sensor 170 may be a Passive Infrared Sensor (PIR), a Position Sensitive Device (PSD), etc.

The object detection sensor 170 may include a first sensor 171 and a second sensor 172 spaced apart from each other, such as up and down. More specifically, the first sensor 171 may sense a front object, and the second sensor 172 (disposed below the first sensor 171) may sense a front and lower object. The first sensor 171 may be disposed at a bezel portion 131 of the display unit 130, and the second sensor 172 may be disposed at an inclined portion 122a of a lower end of the refrigerator door 120.

When the refrigerator 100 operates in a general mode, the refrigerator door 120 may be configured to be automatically open and closed by being interworked with the object detection sensor 170. For example, if an object positioned within a sensing region of the second sensor 172 is sensed, and an object positioned within a sensing region of the first sensor 171 has been sensed, a controller 100a may control the refrigerator door 120 to open.

As an example, a user's approach to the refrigerator 100 may be sensed by the first sensor 171, and a user's approach to the refrigerator door 120 may be sensed by the second sensor 172. Such an automatic opening technique of the refrigerator door 120 may provide a user with convenience in a situation where the user holds objects with his or her two hands.

A beam output unit 173 may be disposed near the second sensor 172, and may be configured to output beams onto a bottom surface corresponding to the sensing region of the second sensor 172 when an object is sensed by the first sensor 171. For example, the beam output unit 173 may output "Door Open" so that a user may put his or her feet on a corresponding position in an intuitive manner in order to open the refrigerator door 120.

Examples may be described to perform a crime prevention function, a silver care function or a children care function by using a home automation system 1 that includes the refrigerator 100. This may include using a communication function of the refrigerator 100 and at least one of the object detection sensor 170, the camera 160 and the door switch 140.

Figure 3:
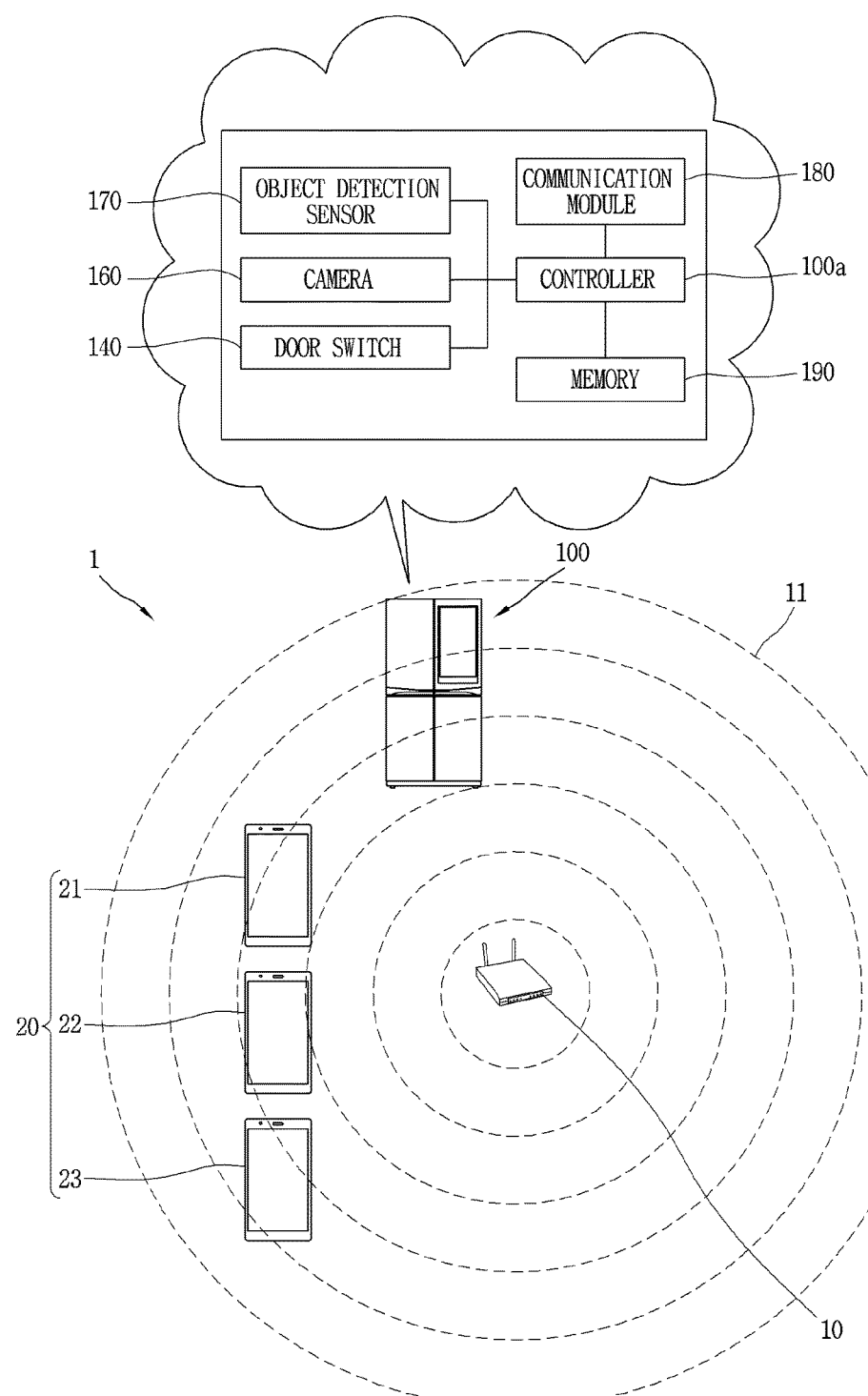
FIG. 3 is a conceptual view showing an example of a home automation system including the refrigerator shown in FIG. 1.

FIG. 3 is a conceptual view showing an example of the home automation system 1 including the refrigerator 100 shown in FIG. 1. Other embodiments and configurations may also be provided.

FIG. 3 shows the home automation system 1 includes an access point (AP) 10, and the refrigerator 100 and the mobile terminals 20 that are connected to the AP 10 for communication. The refrigerator 100 may be provided with a smart hub function, and may be configured to directly communicate with the mobile terminals 20 without an additional server by its own computation ability. Alternatively, the AP 10 may be provided with a server function.

The AP 10 is a device for extending a wired communication network to a wireless communication network 11, such as at home, and may be called a Wi-Fi sharer. The wireless communication network 11 may be provided at home by the AP 10. The refrigerator 100 may be connected to the AP 10 by wire or wirelessly, and the mobile terminals 20 are wirelessly connected to the AP 10.

The refrigerator 100 may include the controller 100a, the object detection sensor 170, the camera 160, the door switch 140, a communication module 180 (or communication device), and a memory 190. Explanations about the object detection sensor 170, the camera 160 and the door switch 140 may be provided.

The controller 100a may control an entire driving (or all operations) of the refrigerator 100. A sensing signal from the object detection sensor 170 and/or the door switch 140, or an image captured by the camera 160 may be transmitted to the controller 100a. The controller 100a may control the communication module 180 to perform communication. The controller 100a may store data in the memory 190, and/or may call the stored data.

The communication module 180 is connected to the wireless communication network 11 formed by the AP 10 in a wired or wireless manner with the AP 10. For example, the communication module 180 may be wirelessly connected to the AP 10 through Wi-Fi access.

The memory 190 may store therein not only information on stored food (e.g., an expiration date), but also information for recognizing the mobile terminals 20 (e.g., Mac Address), facial information of a preset user, etc. The preset user may be a family member, for example.

The mobile terminals 20 may be connected to the wireless communication network 11 (formed by the AP 10) in a wired or wireless manner with the AP 10. For example, the mobile terminals 20 may be wirelessly connected to the AP 10 through Wi-Fi access or through a mobile communication technology such as LTE and 3G. The mobile terminals 20 may be mobile terminals that belong to preset users respectively (e.g., smart phones 21, 22, 23).

When the users are at home, the mobile terminals 20 may be connected to the AP 10 through Wi-Fi access (i.e., a connected state). On the other hand, if the users go out of the home, the connected state between the mobile terminals 20 and the AP 10 may be released.

Since information for recognizing the mobile terminals 20 is stored in the memory 190, it may be determined whether the mobile terminals 20 connected to the AP 10 are the mobile terminals 20 owned by preset users. Alternatively, a password for restricting any access may be set to the AP 10, for access by only the mobile terminals 20 owned by the preset users.

An application for monitoring or controlling an operation of the refrigerator 100 may be installed at the mobile terminals 20. A server of the application may be provided at the refrigerator 100 having a smart hub function, and/or may be provided at the AP 10 having a server function. A device serving as the server of the application may also be provided.

Figure 4:
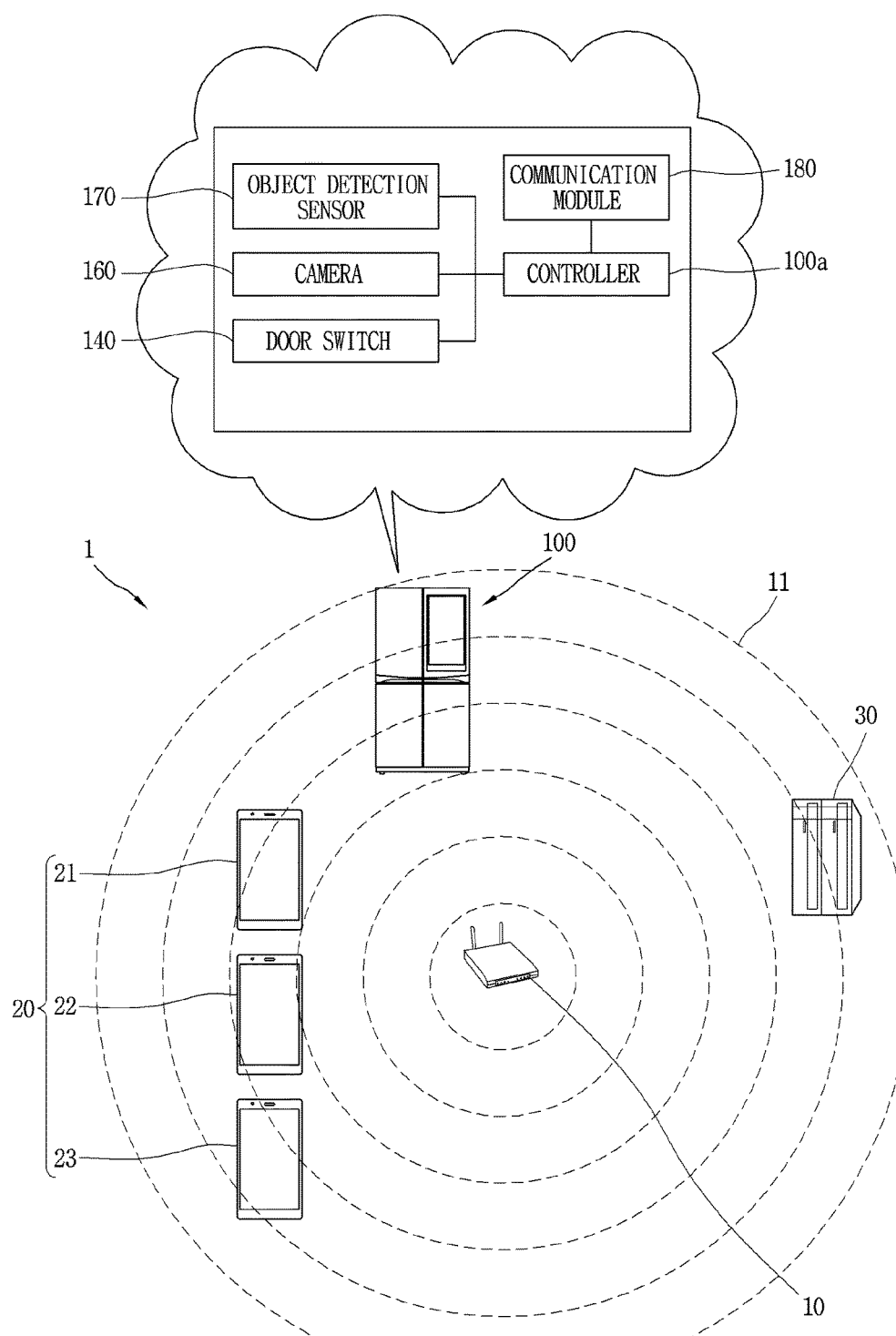
FIG. 4 is a conceptual view showing another example of the home automation system including the refrigerator shown in FIG. 1.

FIG. 4 is a conceptual view showing another example of the home automation system 1 including the refrigerator 100 shown in FIG. 1. Other embodiments and configurations may also be provided.

FIG. 4 shows the home automation system 1 that includes the AP 10, the refrigerator 100 connected to the AP 10 for communication, and a server 30.

The server 30 may be a device serving as the server of the application discussed with respect to FIG. 3, and may be separately provided from the refrigerator 100 or the AP 10. The server 30 may be provided outside a home, and/or at home in the form of a home server.

The AP 10 may be connected to the server 30 so as to perform communication. The mobile terminals 20 may be connected to the server 30 so as to perform communication, through Wi-Fi access to the AP 10, or through a mobile communication technology, such as LTE and 3G.

Since the server 30 is additionally provided, a control (related to a driving of an application) may be performed by the server 30. The server 30 may store therein information related to a driving of an application, such as information for recognizing the mobile terminals 20 (e.g., Mac Address), and/or facial information of a preset user.

A technology for the refrigerator 100 may not be described to perform a crime prevention function, a silver care function or a children care function, based on the home automation system 1 (of FIG. 3). The following descriptions may be applied to the home automation system 1 (of FIG. 4) in a similar manner or in the same manner. For example, in the home automation system 1 (of FIG. 3), the refrigerator 100 and the mobile terminals 20 may perform direct communication with each other. On the other hand, in the home automation system 1 (of FIG. 4), the refrigerator 100 and the mobile terminals 20 may perform communication with each other along with the additional server 30.

Figure 5:
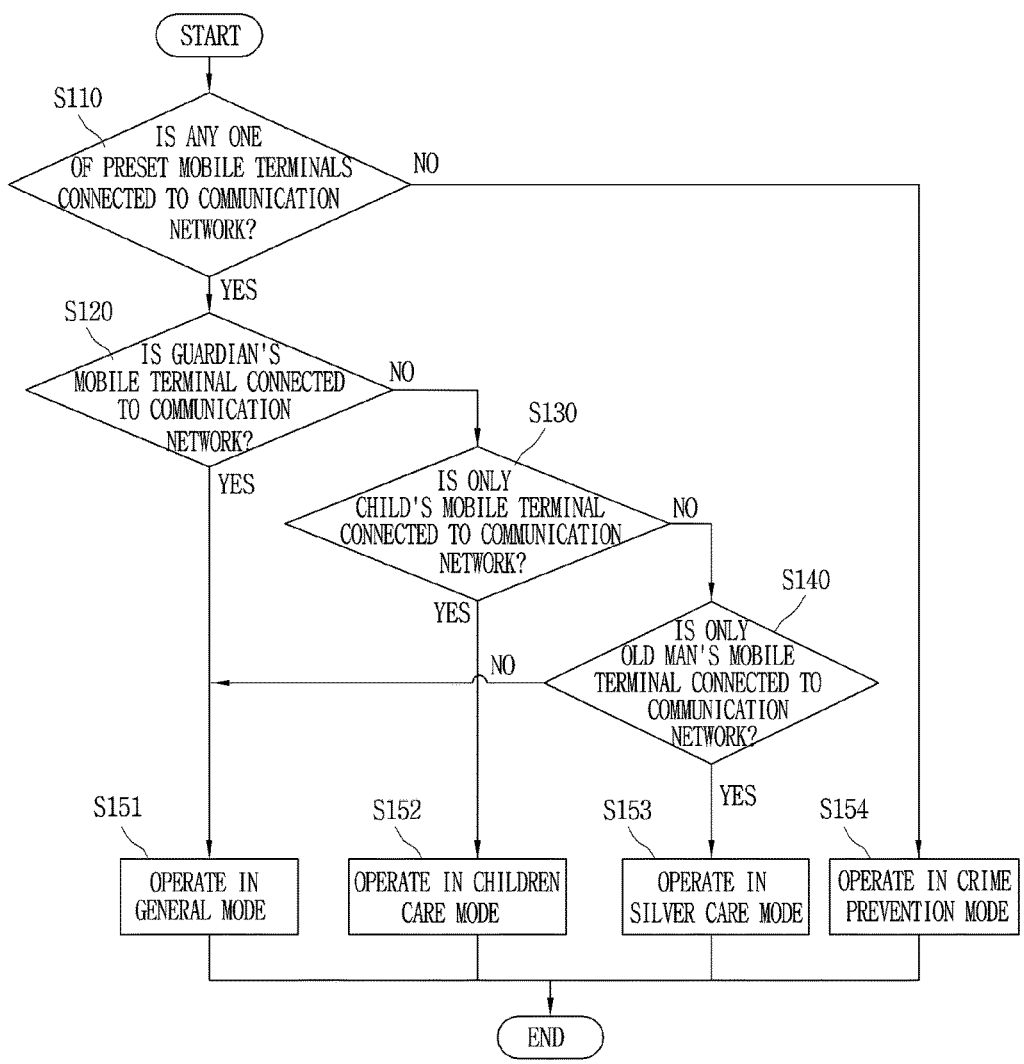
FIG. 5 is a flowchart showing a method for a refrigerator to enter a specific mode based on a connected state between a wireless communication network and a preset mobile terminal.

FIG. 5 is a flowchart showing a method for the refrigerator 100 to enter a specific mode based on a connected state between the wireless communication network 11 (or the communication device) and the mobile terminals 20. Other embodiments and configurations may also be provided.

The refrigerator 100 may be configured to operate not only in a general mode where the original function of the refrigerator 100 is performed, but also in a specific mode (different from the general mode). The specific mode may include at least one of a crime prevention mode to perform a security function for an empty house, a silver care mode to monitor an activity state of an old person (man), for example, who is at home alone, and a children care mode to monitor an activity state of a child who is home alone. In the specific mode, the refrigerator 100 may perform other functions as well as its original function, which is originally performed in the general mode.

The refrigerator 100 may be configured to perform a corresponding function by operating in a specific mode (a general mode, a crime prevention mode, a silver care mode, a children care mode, etc.) by actively determining whether a user is at home (or not), and without a user's setting. For this, the controller 100a may control the refrigerator 100 to operate in a specific mode based on a connected state between the wireless communication network 11 and the mobile terminals 20.

This may be explained with reference to FIG. 5. The controller 100a may determine whether identification information of the mobile terminals 20 stored in the refrigerator 100 or the AP 10 (e.g., Mac Address) matches identification information of a mobile terminal 20 connected to the AP 10 (S110). The controller 100a may perform the determination at preset time intervals, thereby continuously monitoring whether a family member is at home (or not).

If all of family members are not at home, then any mobile terminal 20 of a family member is not connected to the AP 10. Thus, the controller 100a may determine that all of the mobile terminals 20 are not connected to the wireless communication network 11 (formed by the AP 10), thereby controlling the refrigerator 100 to operate in a crime prevention mode to perform a security function for an empty house (S154).

If at least one of the mobile terminals 20 is not connected to the wireless communication network 11, the controller 100a may control the refrigerator 100 to operate in a crime prevention mode. However, if there is at least one of the mobile terminals 20 connected to the wireless communication network 11, then the controller 100a may perform a different control according to an owner (a user) of the preset mobile terminal.

If the mobile terminals 20 connected to the wireless communication network 11 include a guardian's mobile terminal 20, the controller 100a may control the refrigerator 100 to operate in a general mode (S120, S151). The reason is because a crime prevention mode, a silver care mode or a children care mode may be performed by a guardian if the guardian is at home.

If a guardian is not connected to the wireless communication network 11, then the controller 100a may determine whether only a specific mobile terminal 20 except for the guardian's mobile terminal 20 is connected to the wireless communication network 11 (S120, S130, S140). If only an old person's (man's) mobile terminal 20 is connected to the wireless communication network 11, then the controller 100a may control the refrigerator 100 to enter a silver care mode (S153). On the other hand, if only a child's mobile terminal 20 is connected to the wireless communication network 11, the controller 100a may control the refrigerator 100 to enter a children care mode (S152). If both the old person's (man's) mobile terminal 20 and the child's mobile terminal 20 are connected to the wireless communication network 11 because both an old person (or old man) and a child are at home, the controller 100a may control the refrigerator 100 to operate in a general mode (S151).

An operation performed according to each of the aforementioned modes may be explained in more detail.

Figure 6:
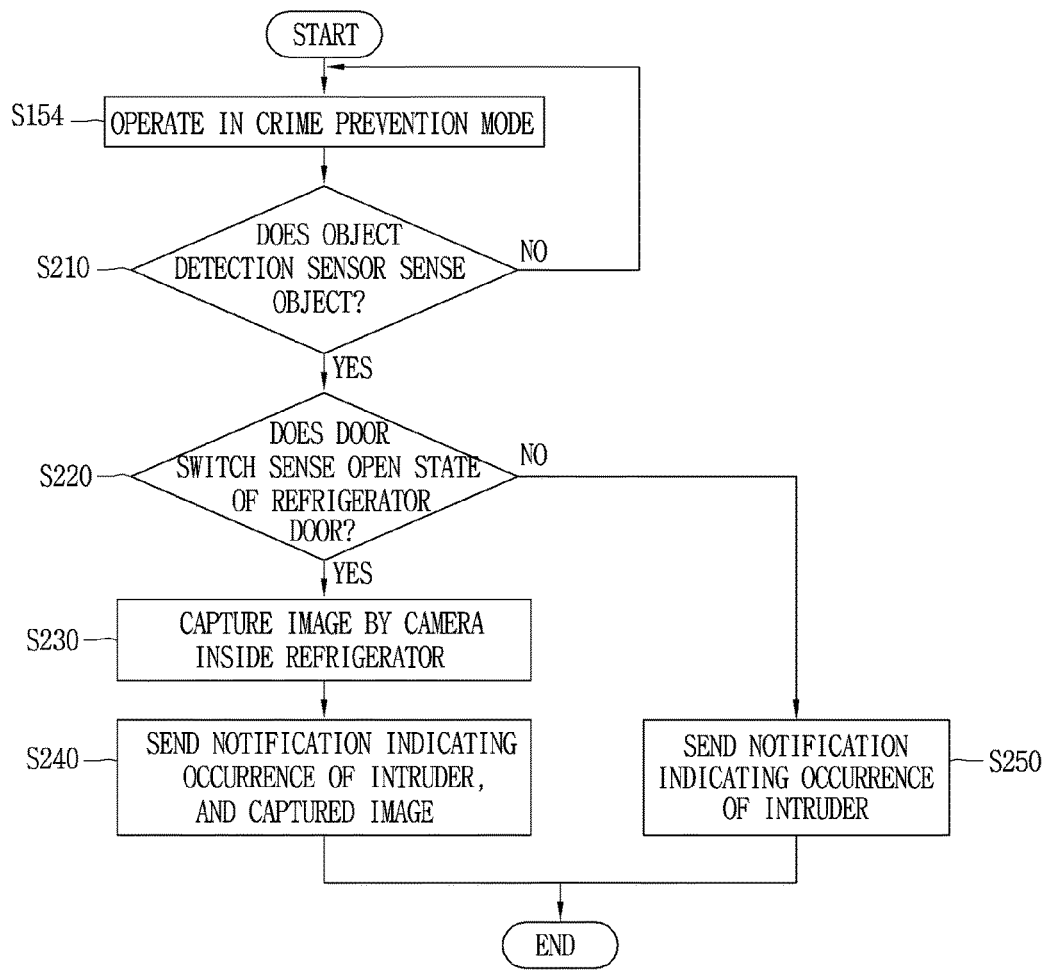
FIG. 6 is a flowchart showing an example to perform a crime prevention function in a crime prevention mode.

FIG. 6 is a flowchart showing an example to perform a crime prevention function in a crime prevention mode. In this embodiment, a crime prevention function using the object detection sensor 170, the door switch 140 and the camera 160 may be described. Other embodiments and configurations may also be provided.

Referring to FIG. 6, if nobody is at home as all of family members go out, the refrigerator 100 may enter a crime prevention mode (S154). In this example, if an intruder (e.g., a thief) hovers around the refrigerator 100, the intruder may be sensed by the object detection sensor 170.

The controller 100a is configured to transmit a notification informing occurrence of an intruder to at least one of the mobile terminals 20 through a communication network, when an object sensing signal is received from the object detection sensor 170 when the refrigerator is in a crime prevention mode (S210, S250).

The thief may show a behavior pattern to open all doors (such as a drawer and a wardrobe), and to put all items (goods) stored therein on a floor. The thief may show a behavior pattern to open the refrigerator door 120 of the refrigerator 100. Considering such a thief's behavior patterns, the camera 160 may be configured to capture an image around the refrigerator door 120 when the refrigerator door 120 is open, to acquire an image about the thief's appearance or face, and to send the image.

If an object sensing signal is received from the object detection sensor 170 and a signal indicating an open state of the refrigerator door 120 is received from the door switch 140, the controller 100a may control the camera 160 to capture an image (S210, S220, S230). The controller 100a may control a notification informing occurrence of the intruder and the captured image, to be sent to at least one of the mobile terminals 20 through a communication network (S240).

The transmission of the notification and the image may be implemented in the form of a push notification on an application. Accordingly, users of the mobile terminals 20 may be informed of the intruder who has intruded an empty house, and/or of appearance or a face of the intruder. The mobile terminals 20 may be mobile terminals 20 of all family members. The controller 100a may control the notification and the image to be sent not only to the mobile terminals 20, but also to a police station, for example.

Figure 7:
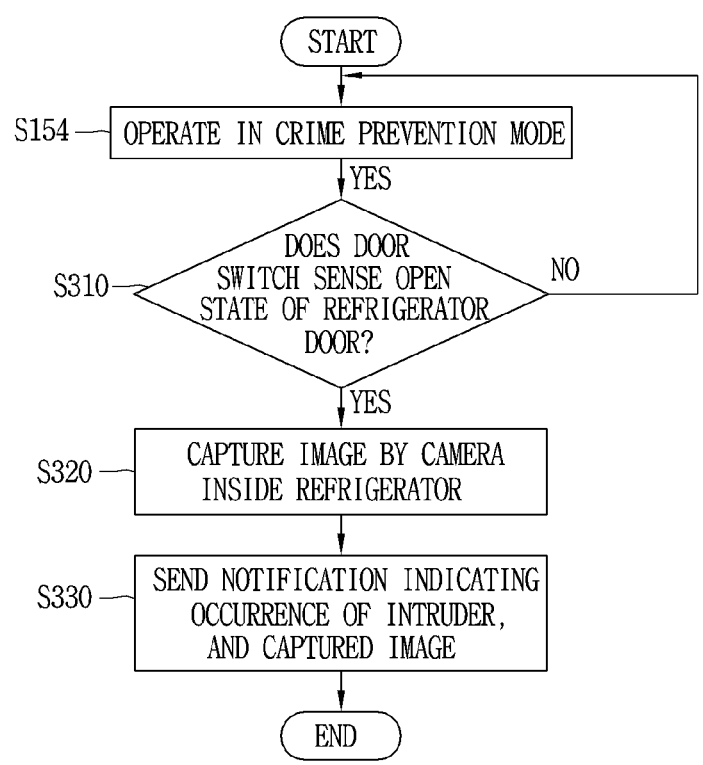
FIG. 7 is a flowchart showing another example to perform a crime prevention function in a crime prevention mode.

FIG. 7 is a flowchart showing another example to perform a crime prevention function in a crime prevention mode. In this embodiment, a crime prevention function (or mode) using the door switch 140 and the camera 160 may be described. Other embodiments and configurations may also be provided.

Referring to FIG. 7, if nobody is at home as all of family members go out, the refrigerator 100 may enter a crime prevention mode or function (S154). In this example, if an intruder (e.g., a thief) opens the refrigerator door 120, the door switch 140 may sense the intruder.

The controller 100a is configured to send a notification informing occurrence of the intruder to at least one of the mobile terminals 20 through a communication network, when a signal indicating an open state of the refrigerator door 120 is received from the door switch 140 when the refrigerator is in a crime prevention mode (S310).

When a signal indicating an open state of the refrigerator door 120 is received from the door switch 140, the controller 100a may control the camera 160 to capture an image (S320). The controller 100a may control a notification informing occurrence of the intruder and the captured image, to be sent to at least one of the mobile terminals 20 through the communication network (S330).

The transmission of the notification and the image may be implemented in the form of a push notification on an application. Accordingly, users of the mobile terminals 20 may be informed of the intruder who has intruded an empty house, and/or of appearance or a face of the intruder. The mobile terminals 20 may be the mobile terminals 20 of all family members. The controller 100a may control the notification and the image to be sent not only to the mobile terminals 20, but also to a police station, for example.

Figure 8:
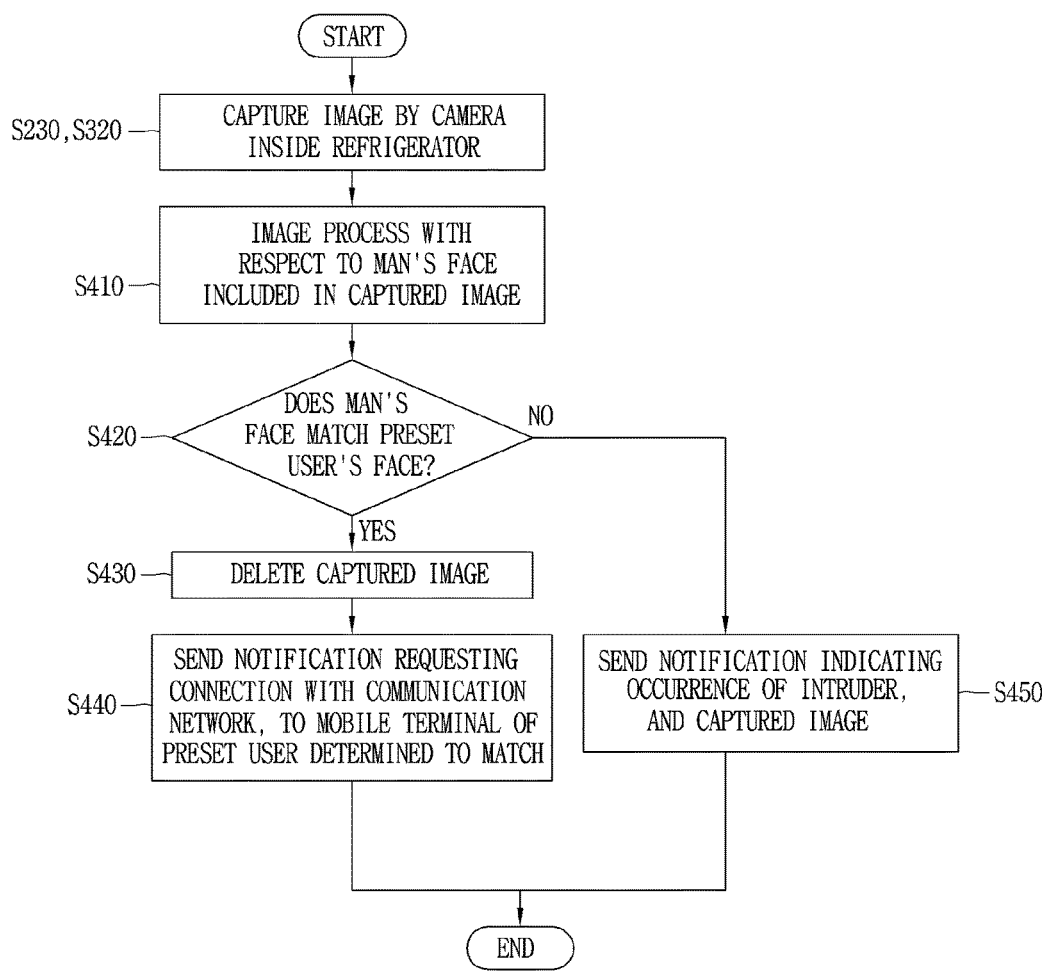
FIG. 8 is a flowchart showing a method to prevent a user from being misunderstood as an intruder, in a case where a refrigerator operates in a crime prevention mode even if a user is at home.

FIG. 8 is a flowchart showing a method to prevent a user from being misunderstood as an intruder, when the refrigerator 100 operates in a crime prevention mode (or function) even if a user is at home. Other embodiments and configurations may also be provided.

Even if a user is at home, the refrigerator 100 may erroneously operate in a crime prevention mode (or function) (S154). For example, when a user turns off a Wi-Fi function of the mobile terminals 20, the mobile terminals 20 are not connected to the wireless communication network 11

(formed by the AP 10). As a result, the controller 100a may determine that there is nobody at home, and thus may control the refrigerator 100 to enter a crime prevention mode (or function).

In this example, the camera 160 may operate to capture an image by misunderstanding the user as an intruder, and/or the captured image may be sent. To prevent this, the controller 100a may perform an image processing with respect to a man's face included in the image captured by the camera 160, and determine whether the face included in the captured image matches a preset user's face (S230, S320, S410). The preset user may be a family member, and information on the preset user's face may be stored in the memory 190 of the refrigerator 100, the AP 10 having a server function, and/or the additional server 30.

If it is determined that the face included in the captured image matches the preset user's face, the controller 100a may delete the captured image (S420, S430). This may prevent storage or transmission of an image captured due to misunderstanding as an intruder.

On the other hand, if it is determined that the face included in the captured image does not match the preset user's face, the controller 100a may recognize the person included in the captured image as an intruder, and may send a notification informing occurrence of the intruder and the captured image, to at least one of the mobile terminals 20 through a communication network (S420, S450). Such processes are the same as the aforementioned ones.

Since the refrigerator 100 is still in the crime prevention mode, and if the crime prevention mode is not released, such a misunderstanding may occur continuously. To prevent this, the controller 100a is configured to send a notification requesting a connected state to the wireless communication network 11, to a mobile terminal 20 of the preset user determined to match, through the communication network (S440). The transmission of the notification may be implemented in the form of a push notification on an application.

Through such a notification serving as a guide, a user of the corresponding mobile terminal 20 may turn on a Wi-Fi function such that the user's mobile terminal 20 may be connected to the wireless communication network 11 formed by the AP 10. As a result, the controller 100a may determine that the user is at home, and may control the refrigerator 100 to enter a general mode (a silver care mode or a children care mode if an old person (man) or a child is alone at home).

Figure 9:
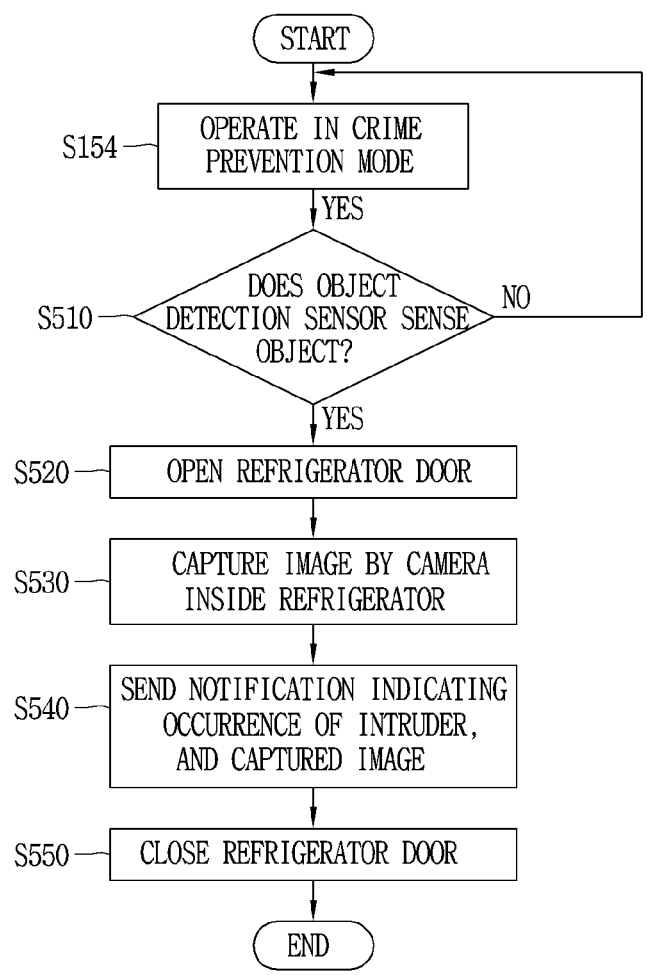
FIG. 9 is a flowchart showing a method to perform an enhanced crime prevention function through a combination between an object detection sensor and a camera, in a crime prevention mode.

FIG. 9 is a flowchart showing a method to perform an enhanced crime prevention function through a combination between the object detection sensor 170 and the camera 160, when the refrigerator is in a crime prevention mode (or function). Other embodiments and configurations may also be provided.

If an intruder does not open the refrigerator door 120, the camera 160 is not exposed to the outside and does not capture appearance or a face of the intruder. In order to overcome such a limitation, a control method may capture an intruder by automatically opening the refrigerator door 120 when the intruder is sensed by the object detection sensor 170.

Referring to FIG. 9, in an example where the refrigerator 100 operates in a crime prevention mode, if an object sensing signal is received from the object detection sensor 170, the controller 100a may control the refrigerator door 120 to open, and/or may control the camera 160 to capture an image around the refrigerator door 120 (S154, S510, S520, S530). The crime prevention mode may be set according to whether the aforementioned wireless communication network 11 and the mobile terminals 20 are connected to each other, and/or may be manually set according to a user's selection.

The controller 100a may be configured to perform the control only when an object is sensed by the first sensor 171 positioned on a relatively upper side between the first and second sensors 171, 172 of the object detection sensor 170. This may prevent a pet from being misunderstood as an intruder.

The controller 100a may be configured to send a notification informing occurrence of the intruder and the captured image, to at least one of the mobile terminals 20 through a communication network (S540). The control method discussed with reference to FIG. 8 may be used (i.e., a method of preventing a user from being misunderstood as an intruder when the refrigerator 100 operates in a crime prevention mode even if a user is at home).

The controller 100a may control the open refrigerator door 120 to close (S550). The process of closing the refrigerator door 120, the process of informing occurrence of the intruder, and/or the process of transmitting the captured image may be performed in another order, and/or may be performed simultaneously.

Figure 10:
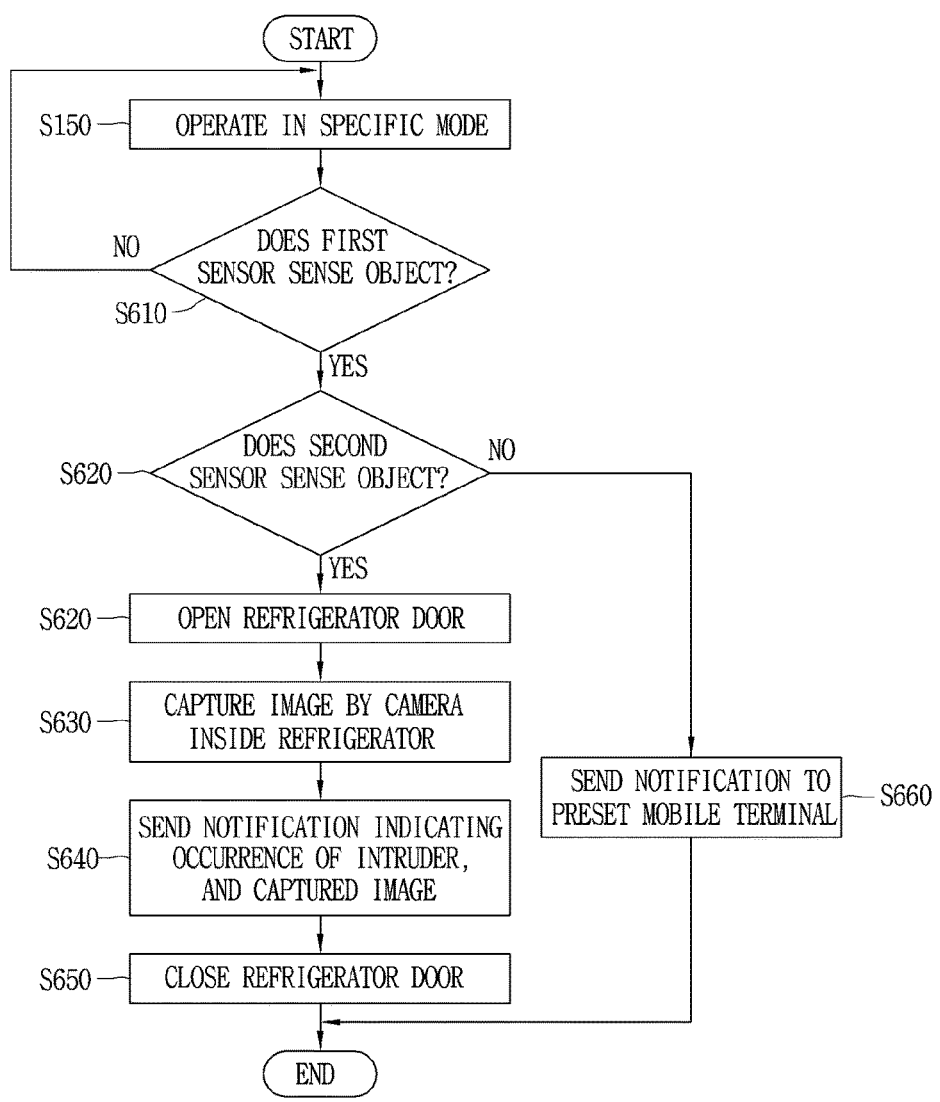
FIG. 10 is a flowchart showing a method to recognize a person (man) and a pet in a distinguished manner, by using a plurality of sensors provided at a refrigerator door.

FIG. 10 is a flowchart showing a method to recognize a person and a pet in a distinguished manner, by using a plurality of sensors provided at the refrigerator door 120. Other embodiments and configurations may also be provided.

In an example where a user has a pet at home, all of family members may go out while leaving the pet alone in an empty house. The pet may be sensed by the object detection sensor 170 moving around in the house.

The object detection sensor 170 may include the first and second sensors 171, 172 arranged to be spaced apart from each other up and down. Considering a size of a pet, the pet may be sensed by the second sensor 172 positioned on a lower side between the first and second sensors 171, 172 of the object detection sensor 170.

When the refrigerator 100 operates in a specific mode, if an object by the second sensor 172 is sensed and an object by the first sensor 171 is not sensed, the controller 100a may control a notification not to be sent (S150, S610). That is, if an object by the first sensor 171 is not firstly sensed, even if an object by the second sensor 172 is sensed, the controller 100a does not determine that an intruder has occurred, but determines that a pet has moved around.

As a control method according to whether an object by the second sensor 172 is sensed after an object by the first sensor 171 is sensed, the aforementioned control methods may be used (S620, S630, S640, S650, S660). Detailed explanations thereof may be replaced by the aforementioned ones and the flowchart of the drawing.

A specific mode distinguished from a general mode may include not only the aforementioned crime prevention mode, but also the aforementioned silver care mode or children care mode to monitor an activity state of an old person (man) or a child who is at home alone. The silver care mode and the children care mode may be explained in more detail.

Figure 11:
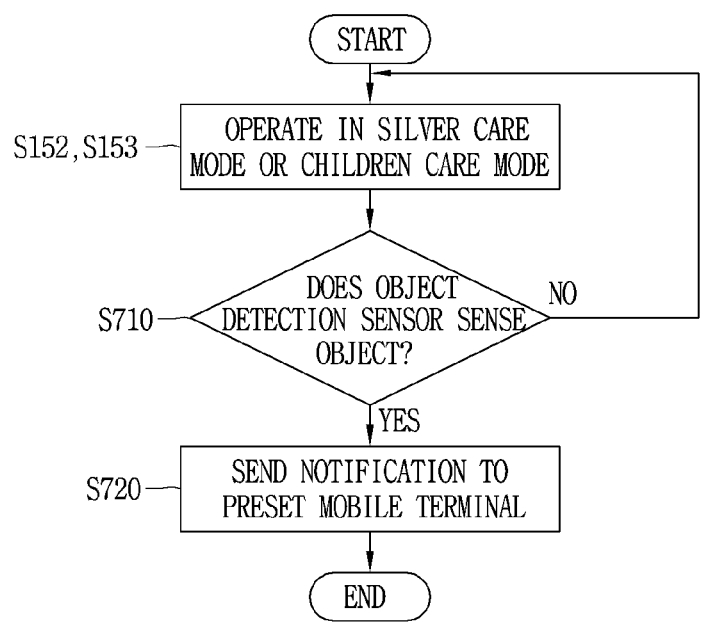
FIG. 11 is a flowchart showing a method to perform a corresponding function by using an object detection sensor in a silver mode or a children mode.

FIG. 11 is a flowchart showing a method to perform a corresponding function by using the object detection sensor 170 in a silver care mode or a children care mode. Other embodiments and configurations may also be provided.

Referring to FIG. 11, in a state that a guardian is not connected to the wireless communication network 11, if only an old person's (man's) mobile terminal 20 is connected to the wireless communication network 11, the controller 100a may control the refrigerator 100 to enter a silver care mode (S152). On the other hand, under the same state, if only a child's mobile terminal 20 is connected to the wireless communication network 11, the controller 100a may control the refrigerator 100 to enter a children care mode (S153).

If an object sensing signal is received from the object detection sensor 170 in a silver care mode or a children care mode, the controller 100a may control a notification to be sent to at least one of the mobile terminals 20 through a communication network (S710, S720). The transmission of the notification may be implemented in the form of a push notification on an application.

The mobile terminal 20 may be a guardian's mobile terminal 20. Thus, the guardian may check through the notification that a person or a child is at home safely.

One aspect of the detailed description is to provide a refrigerator capable of performing a corresponding function by operating in a specific mode (a general mode, a crime prevention mode, a (silver) care mode or children care mode, etc.) by actively determining whether a user is at home (or not) without a user's setting.

One aspect of the detailed description is to provide a refrigerator capable of preventing a user who is at home from being misunderstood as an intruder, in a crime prevention mode.

One aspect of the detailed description is to provide a refrigerator capable of extending its functions performed in a specific mode, by utilizing various functions of the refrigerator serving as a smart device.

To achieve these and other advantages, as embodied and broadly described herein, there is provided a refrigerator, comprising: a communication module (or device) provided at the refrigerator and connected to a communication network; and a controller for controlling the refrigerator to operate in a specific mode based on a connected state between the communication network and preset mobile terminals.

The specific mode may include at least one of a crime prevention mode (or function) to perform a security function for an empty house, a care mode (or function) (or silver care function) to monitor an activity state of an old person who is at home alone, and/or a children care mode (or function) to monitor an activity state of a child who is at home alone. The specific mode may include functions of a general mode, and the refrigerator may perform other functions while performing its basic function (storing food at a low temperature) in the specific mode.

To achieve these features and/or advantages, the controller may perform an image processing with respect to a man's face included in the image captured by the camera, and may delete the captured image if it is determined that the man's face included in the captured image matches a preset user's face.

The controller may induce a released state of the crime prevention mode, by sending a notification requesting a connection to a preset mobile terminal of a specific user who is determined to match.

To achieve features and/or advantages, if an object sensing signal is received from the object detection sensor in the specific mode, the controller controls the refrigerator door to be open, controls the camera to capture an image in the open state of the refrigerator door, and sends the image captured by the camera to at least one of the preset mobile terminals through the communication network.

The object detection sensor may include: a first sensor for sensing a front object; and a second sensor disposed below the first sensor, and for sensing a front and lower object. If an object by the second sensor is sensed while an object by the first sensor is not sensed, the controller controls the notification not to be sent.

A refrigerator may include: a communication module provided at the refrigerator and connected to a communication network; an object detection sensor provided at a refrigerator door, and for sensing an object positioned within a predetermined region around the refrigerator door; and a controller for controlling the refrigerator to operate in a specific mode (or function) based on a connected state between the communication network and preset mobile terminals. If an object sensing signal is received from the object detection sensor in the specific mode, the controller sends a notification to at least one of the preset mobile terminals through the communication network.

If at least one of the preset mobile terminals is not connected to the wireless communication network, the controller controls the refrigerator to enter a crime prevention mode.

The refrigerator may include: a camera installed at the refrigerator, and exposed to outside when the refrigerator door is open; and a door switch for sensing whether the refrigerator door is open or not. If a signal indicating an open state of the refrigerator door is received from the door switch in the crime prevention mode, the controller controls the camera to capture an image, and sends the image captured by the camera to at least one of the preset mobile terminals through the communication network.

If only an old person's (man's) mobile terminal or a child's mobile terminal among the preset mobile terminals is connected to the communication network, the controller controls the refrigerator to enter a (silver) care mode or a children care mode.

A refrigerator may include: a communication module provided at the refrigerator and connected to a communication network; a door switch for sensing an open state of a refrigerator door; and a controller for controlling the refrigerator to operate in a specific mode based on a connected state between the communication network and preset mobile terminals. If a signal indicating an open state of the refrigerator door is received from the door switch in the specific mode, the controller sends a notification to at least one of the preset mobile terminals through the communication network.

A refrigerator may include: a communication module provided at the refrigerator and connected to a communication network; an object detection sensor provided at a refrigerator door, and for sensing an object positioned within a predetermined region around the refrigerator door; a camera installed at the refrigerator and exposed to outside when the refrigerator door is open; and a controller for controlling the refrigerator to operate in a specific mode by a user's setting. If an object sensing signal is received from the object detection sensor in the specific mode, the controller controls the refrigerator door to be open, controls the camera to capture an image in the open state of the refrigerator door, and sends the image captured by the camera to at least one of preset mobile terminals through the communication network.

Effects and/or advantages of the above features are as follows.

The controller may control the refrigerator to operate in a specific mode (a general mode, a crime prevention mode, a silver care mode, a children care mode, etc.) based on a connected state between the communication network and the preset mobile terminals. Accordingly, the refrigerator may perform a corresponding function by entering the specific mode by actively determining whether a user is at home (or not), or whether an old person or a child is at home alone, without a user's setting. This may enhance user's convenience because a user does not need to separately set a specific mode for the refrigerator.

If the refrigerator operates in a crime prevention mode to capture an image through the camera, even if a user is at home, the controller determines whether the captured image corresponds to the user through an image processing. This may prevent a user from being misunderstood as an intruder. Further, if the captured image is determined as the user as a result of the image processing, the controller sends a notification requesting a connection with the communication network, to a preset mobile terminal of the user who is determined to match (the corresponding user's preset terminal), through the communication network, thereby guiding the user to release the specific mode.

If an object is sensed by the object detection sensor when nobody is at home, the controller opens the refrigerator door to capture the object by using the camera disposed in the refrigerator. This may provide a more enhanced crime prevention function. The controller may recognize a man and a pet in a distinguished manner by using a plurality of sensors provided at the refrigerator door, resulting in lowering an erroneous recognition rate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
a communication device at the refrigerator to connect to a communication network;
an object detection sensor provided at an outer surface of a refrigerator door, and the object detection sensor to detect an object within a predetermined distance from the object detection sensor; and
a controller that controls the refrigerator to operate in a specific mode based on a connected state between the communication network and at least one of a plurality of preset mobile terminals,
wherein in response to receiving an object sensing signal from the object detection sensor while the refrigerator is operating in the specific mode, the controller contacts the communication device to send a notification to at least one of the preset mobile terminals through the communication network,
wherein the object detection sensor detects any object that can move by itself,
wherein the refrigerator and one of the preset mobile terminals are connected to an access point (AP) at home for communication through Wi-Fi access when a user of the one of the preset mobile terminals is at home, and the one of the preset mobile terminals is disconnected from the AP when the user of the one of the preset mobile terminals is not at home, so that whether the user of the one of the preset mobile terminals is at home is determined,
wherein the controller is to perform a determination whether the one of the preset mobile terminals is connected to the access point at preset time intervals to continuously monitor whether the user of the one of the preset mobile terminals is at home, and
wherein the object detection sensor includes:
a first sensor spaced apart from a floor that senses an object located in a first area that is positioned on a front side of the refrigerator door and spaced apart from the floor; and
a second sensor disposed below the first sensor and to be adjacent the floor, and the second sensor to sense an object located in a second area that is positioned on the front side of the refrigerator door and positioned below the first area,
wherein when the second sensor senses an object while the first sensor does not sense an object, the controller controls components such that a notification is not to be sent.

2. The refrigerator of claim 1, wherein when at least one of the mobile terminals is not connected to the wireless communication network, the controller controls the refrigerator to enter the specific mode, and
wherein the specific mode is a crime prevention mode to perform a security function for an empty house.

3. The refrigerator of claim 2, further comprising:
a camera at the refrigerator, and the camera is exposed to outside the refrigerator when the refrigerator door is open; and
a door switch that senses whether the refrigerator door is open,
wherein in response to receiving, from the door switch, a signal indicating the refrigerator door is open while the refrigerator is in the specific mode, the controller controls the camera to capture an image, and controls the communication device to send the captured image to at least one of the mobile terminals through the communication network.

4. The refrigerator of claim 3, wherein the controller performs an image processing with respect to a face included in the captured image, and deletes the captured image when the face included in the captured image is determined to match a preset face.

5. The refrigerator of claim 4, wherein the controller controls the communication device to send a notification requesting a connection with the communication network, to a mobile terminal of a user determined to match the face in the captured image.

6. The refrigerator of claim 2, further comprising a camera at the refrigerator, and the camera is exposed to outside the refrigerator when the refrigerator door is open,
wherein in response to receiving an object sensing signal from the object detection sensor while the refrigerator is in the specific mode, the controller controls the refrigerator door to open, controls the camera to capture an image while the refrigerator door is open, and controls the communication device to send the captured image to at least one of the mobile terminals through the communication network.

7. The refrigerator of claim 1, wherein when only a specific mobile terminal, from among the mobile terminals, is connected to the communication network, the controller controls the refrigerator to enter the specific mode,
wherein a user of the specific mobile terminal is classified in a first group and a second group according to age, and
wherein the specific mode includes:
a silver care mode to monitor an activity state of an old person when a user of the specific mobile terminal is determined as belonging to the first group; and
a children care mode to monitor an activity state of a child when a user of the specific mobile terminal is determined as belonging to the second group.

8. The refrigerator of claim 1, further comprising:
a door switch that senses an open state of the refrigerator door, and
wherein the controller is to perform a determination whether the one of the preset mobile terminals is connected to an access point at preset time intervals to continuously monitor whether the user of the one of the preset mobile terminals is at home.

9. The refrigerator of claim 8, wherein when at least one of the mobile terminals is not connected to the communication network, the controller controls the refrigerator to enter the specific mode, and
wherein the specific mode is a crime prevention mode to perform a security function for an empty house.

10. The refrigerator of claim 9, further comprising a camera at the refrigerator, and the camera is exposed to outside the refrigerator when the refrigerator door is open,
wherein in response to receiving a signal indicating the open state of the refrigerator door when the refrigerator is operating in the specific mode, the controller controls the camera to capture an image, and controls the communication device to send the captured image to at least one of the mobile terminals through the communication network.

11. The refrigerator of claim 10, wherein the controller performs an image processing with respect to a face included in the captured image, and deletes the captured image when the face included in the captured image is determined to match a preset face.

12. The refrigerator of claim 11, wherein the controller controls the communication device to send a notification requesting a connection with the communication network, to a mobile terminal of a user determined to match the face in the captured image.

13. The refrigerator of claim 8, wherein when only a specific mobile terminal, from among the mobile terminals, is connected to the communication network, the controller controls the refrigerator to enter the specific mode,
wherein a user of the specific mobile terminal is classified in a first group and a second group according to age, and
wherein the specific mode includes:
a silver care mode to monitor an activity state of an old person when a user of the specific mobile terminal is determined as belonging to the first group; and
a children care mode to monitor an activity state of a child when a user of the specific mobile terminal is determined as belonging to the second group.

14. A refrigerator, comprising:
a communication device provided at the refrigerator to connect to a communication network;
an object detection sensor provided at an outer surface of a refrigerator door to detect an object within a predetermined distance from the sensor;
a camera at the refrigerator, and the camera exposed to outside the refrigerator when the refrigerator door is open; and
a controller that controls the refrigerator to operate in a specific mode based on a user's setting,
wherein in response to receiving an object sensing signal from the object detection sensor when the refrigerator is operating in the specific mode, the controller controls the refrigerator door to open, controls the camera to capture an image of outside the refrigerator while the refrigerator door is open, and controls the communication device to send the captured image to at least one of a plurality of mobile terminals through the communication network,
wherein the object detection sensor detects any object that can move by itself,
wherein the refrigerator and one of the plurality of mobile terminals are connected to an access point (AP) at home for communication through Wi-Fi access when a user of the one of the plurality of mobile terminals is at home, and the one of the plurality of mobile terminals is disconnected from the AP when the user of the one of the plurality of mobile terminals is not at home, so that whether the user of the one of the plurality of mobile terminals is at home is determined,
wherein the controller is to perform a determination whether the one of the preset mobile terminals is connected to the access point at preset time intervals to continuously monitor whether the user of the one of the preset mobile terminals is at home, and
wherein the object detection sensor includes:
a first sensor spaced apart from a floor that senses an object located in a first area that is positioned on a front side of the refrigerator door and spaced apart from the floor; and
a second sensor disposed below the first sensor and to be adjacent the floor, and the second sensor to sense an object located in a second area that is positioned on the front side of the refrigerator door and positioned below the first area,
wherein when the second sensor senses an object while no object is sensed by the first sensor, the controller controls components such that a notification is not to be sent.

15. The refrigerator of claim 14, wherein in response to receiving an object sensing signal from the object detection sensor while the refrigerator is operating in the specific mode, the controller contacts the communication device to send a notification to at least one of the mobile terminals through the communication network.

16. The refrigerator of claim 14, wherein the controller performs an image processing with respect to a face included in the captured image, and deletes the captured image when the face included in the captured image is determined to match a preset face.

17. The refrigerator of claim 16, wherein the controller controls the communication device to send a notification requesting a connection with the communication network, to a mobile terminal of a user determined to match the face in the captured image.

18. The refrigerator of claim 14, wherein when only a specific mobile terminal, from among the mobile terminals, is connected to the communication network, the controller controls the refrigerator to enter the specific mode, wherein a user of the specific mobile terminal is classified in a first group and a second group according to age, and wherein the specific mode includes:

a silver care mode to monitor an activity state of an old person when a user of the specific mobile terminal is determined as belonging to the first group; and a children care mode to monitor an activity state of a child when a user of the specific mobile terminal is determined as belonging to the second group.

19. The refrigerator of claim 14, comprising:

a refrigerator body that includes a storage space, wherein the refrigerator body is to be provided on an external surface, and the first sensor is spaced a first distance apart from the external surface when the refrigerator body is provided on the external surface, and the second sensor is spaced a second distance apart from the external surface when the refrigerator body is provided on the external surface, wherein the second distance is greater than the first distance.

20. The refrigerator of claim 1, comprising:

a refrigerator body that includes a storage space, wherein the refrigerator body is to be provided on an external surface, and the first sensor is spaced a first distance apart from the external surface when the refrigerator body is provided on the external surface, and the second sensor is spaced a second distance apart from the external surface when the refrigerator body is provided on the external surface, wherein the second distance is greater than the first distance.

\* \* \* \* \*